Figure 1:
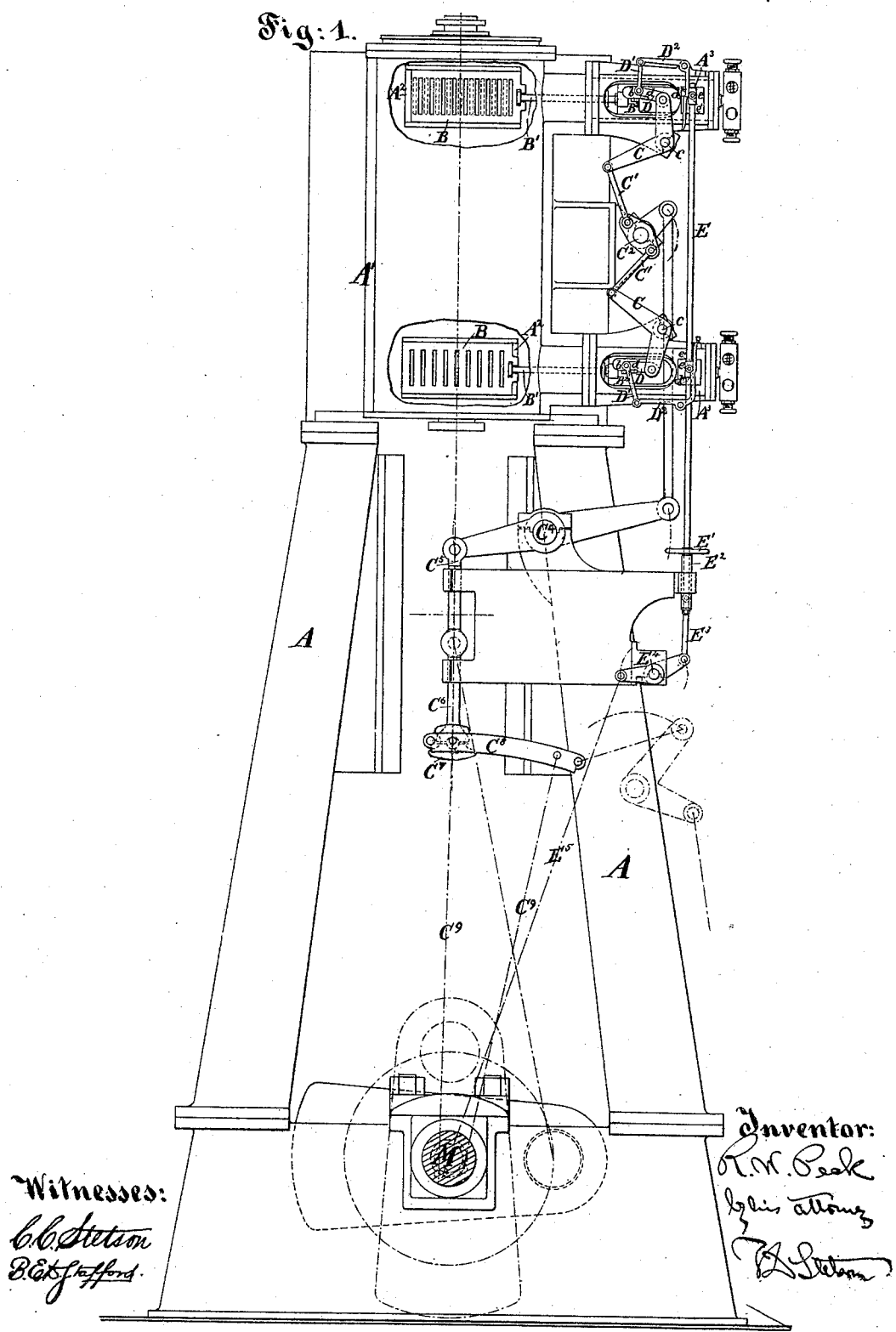

(No Model.)  3 Sheets—Sheet 1.

R. W. PECK.
VALVE GEAR FOR STEAM ENGINES.

No. 286,062. Patented Oct. 2, 1883.

Witnesses:
C. C. Stetson
B. E. Stafford

Inventor:
R. W. Peck
by his attorney (No Model.) 3 Sheets—Sheet 2.
R. W. PECK.
VALVE GEAR FOR STEAM ENGINES.
No. 286,062. Patented Oct. 2, 1883.
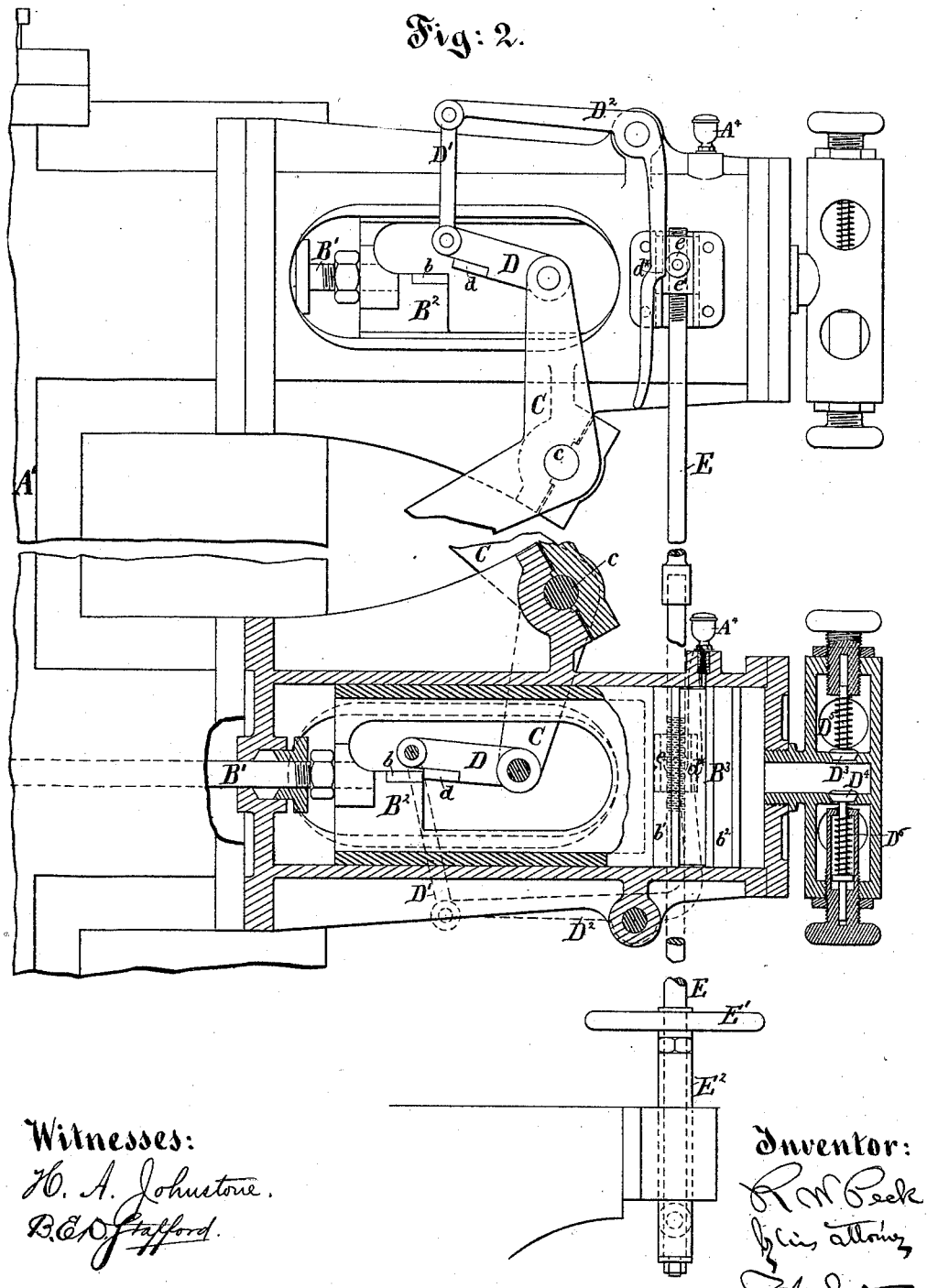
Fig: 2.
Witnesses:
H. A. Johnstone.
B. E. D. Stafford.
Inventor:
R. W. Peck
by his attorney (No Model.) 3 Sheets—Sheet 3.
R. W. PECK.
VALVE GEAR FOR STEAM ENGINES.
No. 286,062. Patented Oct. 2, 1883.
Fig: 3.
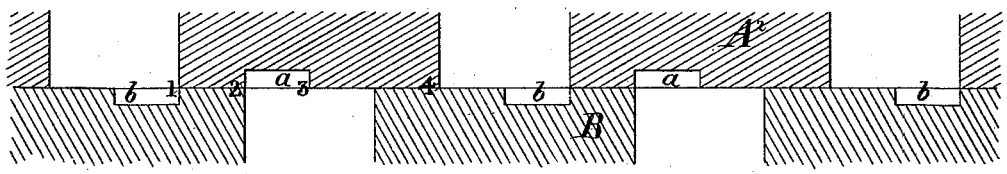
Fig: 4.
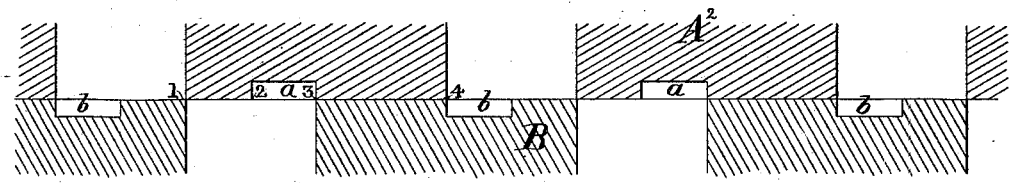
Witnesses:
H. A. Johnstone.
B. E. Stafford.
Inventor:
R. W. Peck
by his attorney

UNITED STATES PATENT OFFICE.

RICHARD W. PECK, OF BROOKLYN, NEW YORK.

VALVE-GEAR FOR STEAM-ENGINES.

SPECIFICATION forming part of Letters Patent No. 286,062, dated October 2, 1883.

Application filed March 27, 1882. (No model.)

*To all whom it may concern:*

Be it known that I, RICHARD W. PECK, of Brooklyn, Kings county, in the State of New York, have invented certain new and useful Improvements in Valve-Gears for Steam-Engines, of which the following is a specification.

The improvements are intended, mainly, for the engines of screw-vessels; but they may be used with success on engines for other purposes. I employ what are known as "gridiron-valves," the construction affording a great area of opening, with only a small amount of motion to open and close. I employ one such valve for each induction-port and another such valve for each eduction-port. I actuate these valves each by a positive opening mechanism, and as to the induction-valves by a liberating-gear and a vacuum-piston to effect the closing. The point of liberation of each valve is adjustable. The eduction-valves are closed by positive connections from the same mechanism. I provide means for equalizing the wear of the valve-seat, so as to avoid the production of ridges under the unequal loads imposed on such valves on different portions of their short traverse. I graduate the force with which the piston acts to effect the closing movement of the induction-valves by admitting air into the cylinder beneath the piston. This weakens the force of the vacuum according as more or less air is received. I provide means for admitting a uniform quantity of air irrespective of the speed at which the engine is turning. This is very important when an engine "races" in a heavy sea. I provide the vacuum-piston with a packing containing a ring of oil with means for supplying the same under moderate pressure, so that the surfaces are constantly lubricated, and any leakage will be oil rather than air.

The following is a description of what I consider the best means of carrying out the invention.

The accompanying drawings form a part of this specification.

Figure 1 is a general elevation of the engine, showing the steam-chest cut open in two places in order to show the invention. Fig. 2 is an elevation on a larger scale, showing the cushioning devices on a larger scale. Certain parts of this figure are shown in section. Figs. 3 and 4 are diagrams showing the valve and its seat in section in two different positions.

Similar letters of reference indicate like parts in all the figures.

I have applied the invention to a compound engine, both the cylinders equipped substantially alike. A description of one will suffice for both.

A is a fixed frame-work, of cast-iron or other suitable material, certain portions of which will be designated, when necessary, as A' A², &c.

A' is the cylinder, and A² a gridiron-valve seat for a gridiron-valve, which controls the induction of the steam. B is such valve. The stem is marked B'. A stout yoke, B², connects the valve with a piston, B³, working in a vacuum-cylinder, A³.

B³ is the vacuum-piston, and tends, by the vacuum induced at each movement to the left within the cylinder A³, to draw the valve B strongly back again into the closed position, where its bars cover the several narrow apertures in the seat A².

C is a bell-crank lever, turning on a center, c, and having a positive rocking motion.

D is a latch, pivoted on the upright arm of C. A steel corner, d, on the latch D engages with a steel corner, b, on the yoke B² at each movement and compels the valve to open at the proper time. This latch D is lifted at the proper time by a connection, D', to a bell-crank lever, D², the lower arm of which is formed with an offset at the point d*. A vertical rod, E, raised and lowered by a connection to the engine, is strongly guided in suitable ways on the fixed framing, and carries a roller, e, which, at the proper time in the stroke of the piston, is lifted past the offset d*, and raises the latch D, thus liberating the valve and allowing it to be promptly closed by the action of the atmosphere on the vacuum-piston B³.

The vacuum which obtains in the cylinder A³ should not be perfect. There must be a pressure sufficiently below that of the external atmosphere to give a strong closing force to the valve and induce a prompt movement thereof as soon as it is liberated; but it is important that there be sufficient air in the cylinder to cushion the piston and prevent its slamming against the end of the cylinder. I make the cylinder A³ and piston B³ of so large area that the force is sufficient with the vacuum weakened by the presence of a large quantity of air. At each closing of the valve and the cushioning of the vacuum-piston a portion of the air is driven out through a valve, D³, opening outward. This is controlled by a spring, D⁵, which is held down with adjustable force by a hollow screw, G', which also serves as a guide for the upper end of the stem of the valve D³. At each opening movement of the valve B, tending to produce a strong vacuum under the piston B³ or between it and the head of the vacuum-cylinder A³, air is inducted past a valve, D⁴, opening inward, and capable of opening to a greater or less extent, according to the rate at which the engine is working. This is loaded by a spring, D⁶, adjustable at will by a hollow screw, G², constructed and arranged as shown. This screw G² serves also to guide the lower end of the stem of the valve D⁴. When the engine is working under ordinary conditions—making, say, seventy revolutions per minute—this valve D⁴ opens but slightly. When by the motion of the sea the propeller is for a moment nearly or quite out of water, and the engine revolves at the rate of two or three hundred revolutions per minute, this valve D⁴ opens wide at each movement. The effect is to always induct so much air as to charge the vacuum-cylinder A³ to about a uniform pressure at each stroke. There is, therefore, practically a uniform quantity of air in the cylinder, the valve B is drawn into the shut position with a uniform force and with a uniform speed, and the piston B³ finds about the same amount of air on which to cushion or to have its closing motion arrested. Whenever it is found that too much air passes into the vacuum-chamber through the valve D⁴, the engineer turns the screw G² in the direction to compress the spring D⁶. Whenever it is found that the air escapes too easily and the vacuum-piston B³ slams against the end of the cylinder, the engineer turns the screw G' to compress the spring D⁵. The action differs from that of cocks, in the fact that the action is nearly the same at all rates of speed.

The piston B³ is much longer than its motion, and the oil-hole communicating from the oil-cup A⁴ leads against a point near the center of its length. The piston has two packings, b' b², one near each end. The space between these packings is kept filled with oil at the slight pressure above atmosphere, due to the elevation of the oil-cup A⁴. This ring or packing of oil, held between the two packings b' b², is moved with each movement of the piston B³, but never to such extent as to break the connection with the supply from the oil-cup. It lubricates the interior of the cylinder, and, by its being interposed, insures that oil rather than air shall be drawn into the space beyond the piston when any slight leaks exist.

The seat A², on which the valve B slides, is not only gridiron, or formed with a number of long narrow apertures divided by cross-bars, but is also grooved along each cross-bar, as indicated at a. The purpose and effect of this is peculiar.

The gridiron-valve B, like all slide-valves, is urged down upon its seat with great force while the valve is moving under its load of steam, and a vacuum obtains in the end of the cylinder which it is to supply—the main cylinder A'. The moment the main piston (not shown) arrives at that end of the cylinder and the valve B opens a little, the steam, flowing past the valve B through the great number of narrow apertures provided, rapidly fills the small space and commences to urge the main piston with its full force. The effect of raising the pressure of the fluid in the cylinder passages or port to about the same as that outside of the valve and in the boiler is to at once relieve the valve from the load under which it was before working, and it travels now a considerable distance under no load.

The diagram Fig. 3 shows the relations of the parts when the gridiron-valve is in the fully-closed position, and Fig. 4 shows the relations when it has moved under the load to the position of commencing to open, at which moment it is relieved of load, and in the further opening movement the valve may rise a little by reason of its not being longer pressed upon its seat by the strong pressure of the steam. Dividing the bottom face of each cross-bar in the valve-seat A² into three parallel bands or stripes, there is an area or stripe, 1 to 2, which is pressed upon and ground down under full pressure by one cross-bar of the gridiron-valve B, and another stripe, 3 to 4, which is similarly or nearly similarly ground by an adjacent cross-bar of the valve; but the area between—that is to say, the area 2 to 3— is never traversed by either bar while the valve is urged down to its seat by the steam-pressure. The bars of the valve B are traversed across that area at each full opening of the valve, but it is after the valve is relieved from load, and consequently after the grinding or wearing action is reduced very greatly. It follows that there is a tendency in all gridiron-valves to wear down the areas 1 to 2 and 3 to 4 faster than the areas 2 to 3, inducing serious mischief in rounding the edges of the valve and lifting the valve off its seat, which is a reason why gridiron-valves have not been heretofore popular. I meet and overcome the difficulty by grooving the valve-seat, as indicated by a. For the same reason and in a similar manner I groove along the faces of the cross-bars of the valve B, as indicated at b.

Thus constructed, the faces work tightly at first and develop no disposition to wear into ridges or to round the edges by use.

The steamship Puebla of the Alexander line, plying between New York, Havana, and Vera Cruz, has all the features set forth in this specification working satisfactorily.

The lever C, which gives the required strong motion to the latch D to open the valve B, is worked by a connection, C', from an arm on a rocking shaft, C², which latter receives motion from an arm on a rocking shaft, C⁴, another arm of which is worked by one or the other of the two eccentrics on the main shaft M, through eccentric-rods C⁹ C⁹, and what is sometimes known as the "Stephenson link," (marked C⁸,) provided with means for shifting it promptly by steam, as will be understood. The link-block is marked C⁷. The rod C⁶ is moved thereby, and the connection C⁵ connects the latter to the proper arm of the shaft C⁴.

The link C⁸ serves only for reversing. It does not effect expansion.

Ordinary provisions are made for insuring that the valve B shall close by a positive motion at the end of the stroke, if it has not been closed earlier.

The exhaust-valves are worked by connections from the same train of mechanism.

The rod E carries two of the rollers e, adapted, one to work the liberating-gear for the upper steam-valve, and the other, at a considerably lower level, to work the same for lower steam-valve. These rollers e e are not set directly upon the rod E. Each is set in a slide, e', guided in suitable ways in the fixed framing. The rod E is formed in a right-handed screw, where it traverses the lower slide e', and in a left-handed screw, where it traverses the corresponding upper slide. The rod E can be turned around in its junction with the slide E², but is compelled to move up and down therewith. The hand-wheel E' is fixed on the rod E. When the hand-wheel E' is turned in one direction, it raises the upper roller e and lowers the corresponding lower roller, similarly marked. This makes the liberating-gear act earlier at each end of the cylinder. When the hand-wheel E' is turned in the other direction, it lowers the upper roller e and raises the lower. This makes the steam follow the piston farther at each end of the cylinder.

The slide E² is worked by a connection, E³, from an arm on a rocking shaft, E⁴, another arm on which is connected by a rod, E⁵, to an eccentric on the main shaft M.

My gridiron valves and seats, formed as shown, effect a free opening and a tight closing of the ports with but a slight amount of opening and closing motion. It follows that a vacuum-piston is required to move but a little distance to effect the working. The combination is effective and peculiarly desirable.

Modifications may be made in many of the details without departing from the principle or sacrificing the advantages of the invention.

When the invention is applied to a compound engine, a complete set of the parts may be provided for the low-pressure part, as well as for the high-pressure part, the steam from the high-pressure cylinder being exhausted into a capacious receiver, from which it is worked expansively into the low-pressure cylinder. In the Puebla the receiver is largely the irregular chamber lying between the two cylinders.

Although my experiments have been with engines worked by steam, by which I mean vapor of water in its ordinary condition, it will be understood that the invention may be used with superheated steam or with various other fluids.

Other means than the rod E and the rollers e may be used to effect the detaching of the latch D. I propose especially to employ adjustable cams or inclines arranged in the paths of the latches D, so that the valves shall be detached by their own motion in the manner now commonly practiced in a large class of steam-engines.

The peculiar form of the valve and its seat, adapted for service as described, it is designed to make the subject of a separate application.

I claim as my invention—

1. In a steam or gas engine, the gridiron-valve B, working on a gridiron-seat, A², in combination with a vacuum-piston, B³, and suitable cylinder, A³, therefor, with means for opening and liberating the valve, and means, substantially as described, for maintaining a uniform pressure in said cylinder, as herein specified.

2. In a steam or gas engine, and in combination with a vacuum-piston, B³, operating in a vacuum-cylinder, A³, to close the valve B by the action of the atmosphere, the weighted lever D⁴ and adjusting means G², arranged to automatically admit air at a uniform pressure into the vacuum-cylinder A³, to modify the action of the valve B and maintain an approximately uniform speed, substantially as herein specified.

3. In a steam or gas engine, and in combination with a vacuum-piston, B³, and a vacuum-cylinder, A³, and valve B, operating as described, the relief or escape valve D, weighted as set forth, and the adjusting means G', whereby a predetermined amount of air is automatically provided to cushion the stroke of the piston B³, substantially as herein specified.

4. In a steam or gas engine, and in combination with the valve B, vacuum-piston B³, and vacuum-cylinder A³, the induction-valve D⁴, weighted as shown, and having adjusting means G², and the relief or escape valve D, similarly weighted, and having adjusting means G', all operating as and for the purposes set forth.

5. In combination with the vacuum-cylinder $A^3$ and vacuum-piston $B^3$, of greater length than its motion, the two packings $b'$ and $b^2$, arranged near each end of the piston $B^3$, to leave a space between them, the oil-cup $A^4$, and oil-passage therefrom leading to said space, whereby a constant ring or packing of lubricating-liquid is maintained around the piston, as herein set forth.

In testimony whereof I have hereunto set my hand, at New York city, New York, this 3d day of March, 1882, in the presence of two subscribing witnesses.

RICHARD W. PECK.

Witnesses:
CHARLES C. STETSON,
WM. C. DEY.